(No Model.)
J. D. WILSON.
COASTING SLED.
No. 385,652. Patented July 3, 1888.
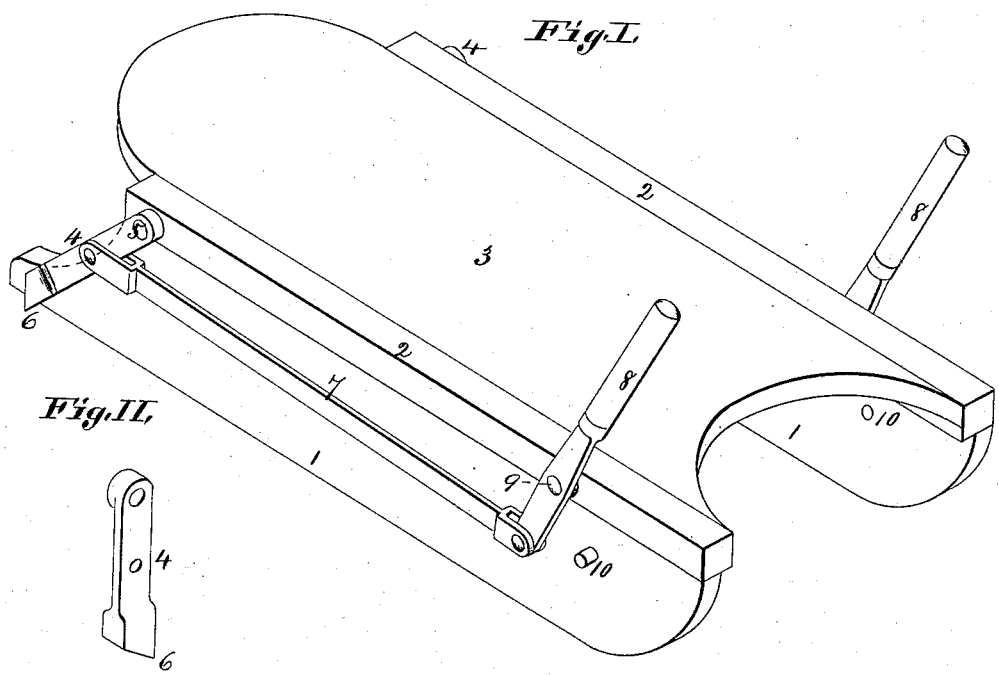
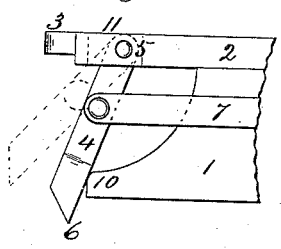
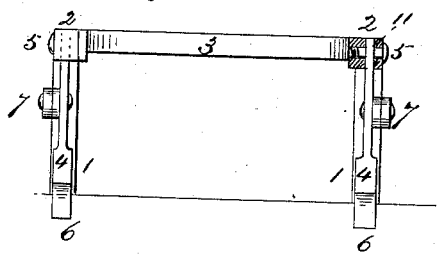
Attest:
E. Arthur
N. E. Burke
Inventor,
John D. Wilson
By Knight Bro.
Attys

UNITED STATES PATENT OFFICE.

JOHN D. WILSON, OF JENNINGS STATION, MISSOURI.

COASTING-SLED.

SPECIFICATION forming part of Letters Patent No. 385,652, dated July 3, 1838.

Application filed February 3, 1888. Serial No. 262,921. (No model.)

*To all whom it may concern:*

Be it known that I, JOHN D. WILSON, of Jennings Station, in the county of St. Louis and State of Missouri, have invented a certain new and useful Improvement in Coasting-Sleds, of which the following is a full, clear, and exact description, reference being had to the accompanying drawings, forming part of this specification.
This is a device for starting, guiding, or stopping the sled by means of a dog on each side, which is operated by a lever.

Figure I is a perspective view of a sled with my improvement applied thereto. Fig. II is a perspective view of the dog. Fig. III is a detail side elevation showing a modification. Fig. IV is a rear elevation of the modification.

The runners of the sled are shown at 1, the side rails at 2, and the top board at 3. At each side and at or near the rear end is a dog, 4, which is hinged at the upper end to the side rail by fulcrum pins 5, and whose lower end, 6, is fitted to take a firm hold of the ice or snow beneath the sled.
7 is a rod connecting the dog on each side to a hand-lever, 8, that is fulcrumed to the side rail at 9. It will be seen that when the upper ends of the levers are drawn backward the lower ends of the dogs are drawn forward and engage against the surface upon which the sled is running. If one of the dogs is drawn forward harder than the other, the sled will turn toward that side. If both of the dogs are drawn forward with sufficient force, the sled may be brought to a stand. When the dogs are used to start the sled, the levers are brought against the stops 10, when the rear end of the sled will be supported on the dogs. To start the sled, the upper ends of the levers are moved forward, which moves the sled forward, the lower ends of the dogs remaining in position until thrown up clear of the track.

In the modification shown in Figs. III and IV the dogs are set at the rear of the runners, the side rails being mortised at 11 to receive the upper ends of the dogs, through which pass the fulcrum pins 5. In this case the rear ends of the rods 7 are not shown as slotted to receive the dogs, but are hinged to the outer sides of the dogs. The stops 10 are dispensed with in this modification, as the rear ends of the runners form stops for the dogs in their forward movement.

I claim as my invention—

The combination, with a sled, of the independently-movable dogs 4, depending from the fulcrum-pins 5 on each side of the sled, rods 7, connecting the dogs directly with the independently-movable hand-levers 8, and stops limiting the forward movement of the dogs, substantially as shown and described.

JOHN D. WILSON.

In presence of—
SAML. KNIGHT,
BENJN. A. KNIGHT.